(12) United States Patent
Guey

(10) Patent No.: US 7,711,029 B2
(45) Date of Patent: May 4, 2010

(54) HOPPING PILOT PATTERN FOR TELECOMMUNICATIONS

(75) Inventor: Jiann-Ching Guey, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1089 days.

(21) Appl. No.: 11/292,415

(22) Filed: Dec. 2, 2005

(65) Prior Publication Data
US 2007/0133462 A1 Jun. 14, 2007

(51) Int. Cl.
*H04B 1/00* (2006.01)
(52) U.S. Cl. .................... 375/133; 375/138; 370/206
(58) Field of Classification Search ............. 375/132, 375/133, 135, 136, 138; 370/203, 206
See application file for complete search history.

(56) References Cited

U.S. PATENT DOCUMENTS

| | | | |
|---|---|---|---|
| 6,047,171 A | 4/2000 | Khayrallah et al. | |
| 6,320,843 B1 | 11/2001 | Rydbeck et al. | |
| 6,332,006 B1 | 12/2001 | Rydbeck et al. | |
| 6,480,556 B1 | 11/2002 | Guey | |
| 6,594,793 B1 | 7/2003 | Guey | |
| 6,671,309 B1 * | 12/2003 | Craig et al. | 375/132 |
| 6,754,253 B2 | 6/2004 | Guey | |
| 6,876,645 B1 | 4/2005 | Guey et al. | |
| 6,954,481 B1 * | 10/2005 | Laroia et al. | 375/132 |
| 6,959,032 B1 | 10/2005 | Richards et al. | |
| 6,961,364 B1 | 11/2005 | Laroia et al. | |
| 6,990,153 B1 * | 1/2006 | Farhang-Boroujeni et al. | 375/260 |
| 7,248,559 B2 * | 7/2007 | Ma et al. | 370/208 |
| 7,292,651 B2 * | 11/2007 | Li | 375/316 |

(Continued)

OTHER PUBLICATIONS

Popovic et al, "User Traffic Multiplexing on OFDM Downlink", Spread Spectrum Techniques and Applications, 2004, IEEE Eighth Int'l. Symposium, Aug. 30-Sep. 2, 2004, pp. 429-433.

(Continued)

*Primary Examiner*—Jean B Corrielus
(74) *Attorney, Agent, or Firm*—Nixon & Vanderhye, P.C.

(57) ABSTRACT

A transmitter (22) of a telecommunications system transmits hopped pilot signals as a distinct (i.e., locally unique) time-frequency shift of a time frequency plane array wherein the pilot signals are hopped using a hopping sequence. Differing transmitters of the system (20) preferably transmit using different time-frequency shifts of the same time frequency plane array. The transmitter (22) knows which hopping sequence to employ to generate the time frequency plane array in view of its storage of the hopping sequence, and further knows how to perform its signature time-frequency shift the time frequency plane array thusly created in view of its storage of the time-frequency shift pattern. A receiver (24) identifies a transmitter from which the receiver obtains signals by detecting the particular time-frequency shift of the time frequency plane array and associating the particular time-frequency shift with the originating transmitter. Upon detecting the time frequency plane array of its received signals, the receiver (24), which knows the hopping sequence employed to generate the time frequency plane array, can determine how the time frequency plane array has been time-frequency shifted, and upon determining the pattern of the shift can associate the received signals with one of the transmitters for which the receiver (24) has stored time-frequency shift patterns in its library (86).

41 Claims, 9 Drawing Sheets

U.S. PATENT DOCUMENTS

| | | | |
|---|---|---|---|
| 7,369,531 B2* | 5/2008 | Cho et al. | 370/343 |
| 7,433,419 B2* | 10/2008 | Yun et al. | 375/296 |
| 2002/0106008 A1 | 8/2002 | Guey | |
| 2004/0071110 A1 | 4/2004 | Guey et al. | |
| 2004/0095902 A1 | 5/2004 | Laroia et al. | |
| 2004/0257979 A1 | 12/2004 | Ro et al. | |
| 2005/0147024 A1* | 7/2005 | Jung et al. | 370/203 |
| 2005/0226141 A1 | 10/2005 | Ro et al. | |
| 2005/0238083 A1* | 10/2005 | Laroia et al. | 375/132 |
| 2005/0249181 A1 | 11/2005 | Vijayan et al. | |
| 2006/0045001 A1* | 3/2006 | Jalali | 370/208 |
| 2007/0036179 A1* | 2/2007 | Palanki et al. | 370/491 |
| 2007/0053282 A1* | 3/2007 | Tong et al. | 370/208 |
| 2008/0310484 A1* | 12/2008 | Shattil | 375/146 |

OTHER PUBLICATIONS

International Search Report and Written Opinion mailed May 16, 2007 in corresponding PCT appln. PCT/SE2006/050455.

International Search Report and Written Opinion mailed Jul. 8, 2008 in PCT application PCT/SE2007/051027.

Chang et al, "Frequency Coded Waveforms for Enhanced Delay-Doppler Resolution", IEEE Transactions on Information Theory, vol. 49, No. 11, 2003, pp. 2960-2971.

Ham et al, "Inverse Filtering in the Presence of Doppler with Application to Specular Multipath Parameter Estimation", 1995 International Conference on Acoustics, Speech, and Signal Processing, 1995, vol. 5, pp. 3167-3170.

Guey et al, "Synchronization Signal Design for OFDM Based on Time-Frequency Hopping Patterns", Conference on Communications, IEEE Communications Society, 2007, pp. 4329-4334.

Benedetto et al, "International Conference on Concatenating Codes for Improved Ambiguity Behavior", Electromagnetics in Advanced Applications, 2007, pp. 464-467.

Costas, "A Study of a Class of Detection Waveforms Having Nearly Ideal Range-Doppler Ambiguity Properties", Proceedings of the IEEE, vol. 72, No. 8, Aug. 1964, pp. 996-1009.

Golomb et al, "Constructions and Properties of Costas Arrays", Proceedings of the IEEE, vol. 72, No. 9, Sep. 1964, pp. 1143-1163.

Klein et al, "Multiple Access OFDM for High Bit Rate Indoor Wireless Systems", Dept. of EECS, University of California Berkeley, Jun. 1999.

Tech. Spec. 3GPP TR 25.892, V2.0.0, $3^{rd}$ Generation Partnership Project; Technical Specification Group Radio Access Network; Feasibility Study for OFDM for UTRAN Enhancement; (Release 6), Jun. 2004.

Janjua et al, "Implementation of OFDM Transmitter Based on the IEEE 802.16d Standard", Dec. 2, 2004.

McNair et al, "OFDM for High Data Rate, High-Mobility, Wide-Area Wireless Communications", Proc. IEEE Sarnoff Symposium, Princeton, NJ, Mar. 2001.

Chang et al, "Transmitter Architecture for Pulsed OFDM" *Proceedings, IEEE Asia Pacific Conference on Circuits and Systems*, pp. 693-696, 2004.

Uysal, et al, "A Space-Time Block-Coded OFDM Scheme for Unknown Frequency-Selective Fading Channels" *IEEE PIMRC'01*, San Diego, USA, Oct. 2001.

* cited by examiner (a) Shifting horizontally (time hopping)

(b) Shifting vertically (frequency hopping)

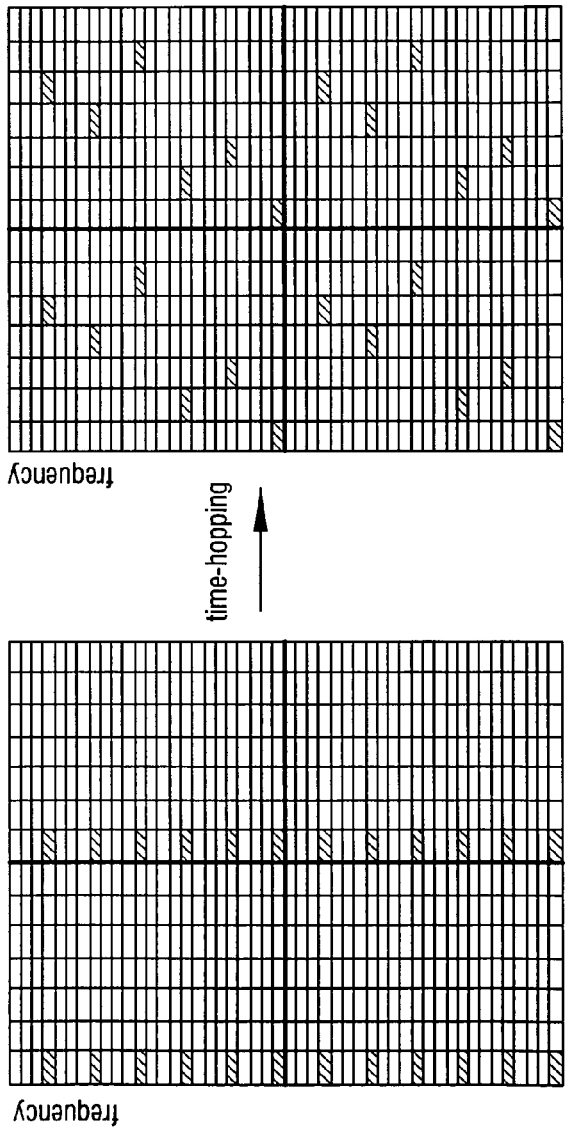
Fig. 3(a)
Fig. 3(b)
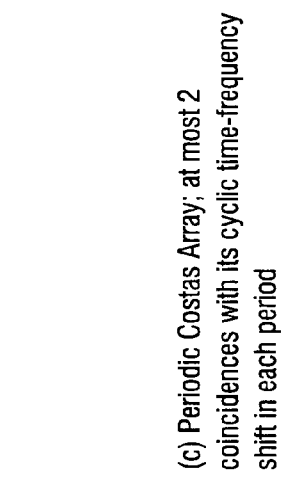
(c) Periodic Costas Array; at most 2 coincidences with its cyclic time-frequency shift in each period
Fig. 4(c)
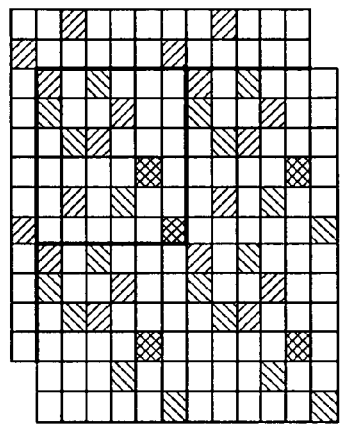
(b) Single coincidence with its time-frequency shift
Fig. 4(b)
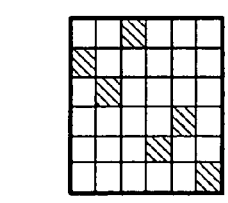
(a) A Costas Array
Fig. 4(a)

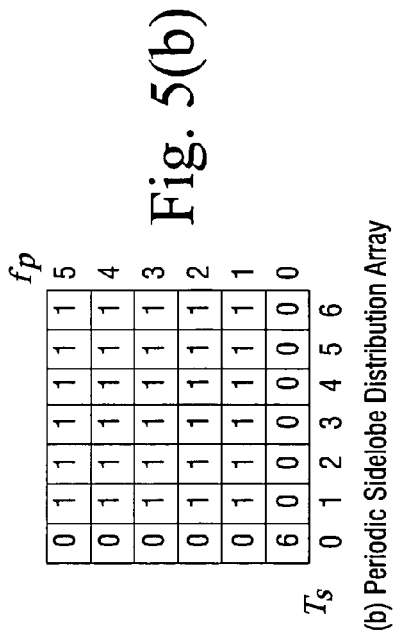
(b) Periodic Sidelobe Distribution Array
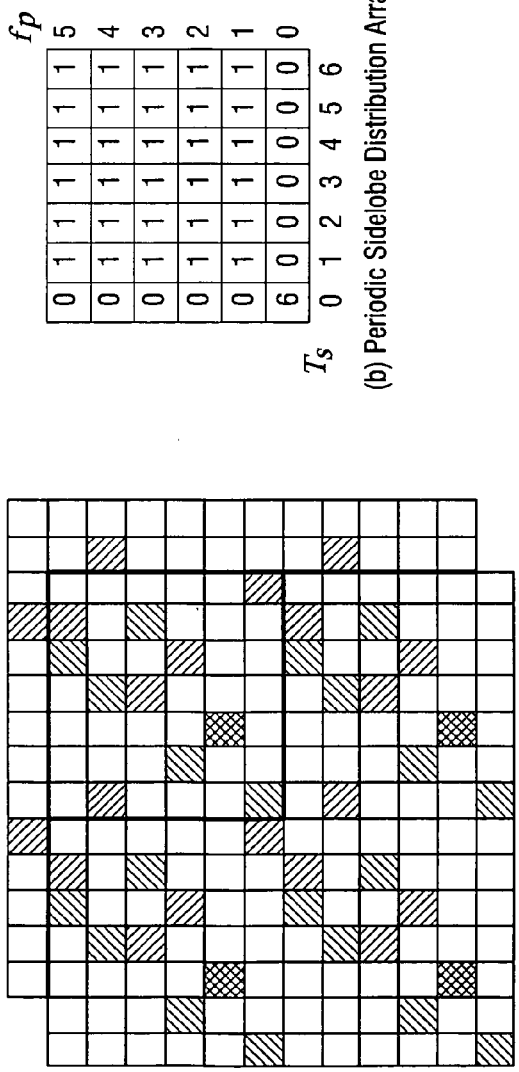
(a) Shifted $2T_s$ in time and $f_p$ in frequency
Fig. 5(a)  Fig. 5(b)
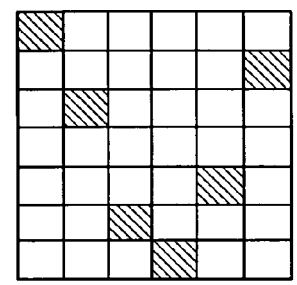
(m=3, n=2) Fig. 6(d)
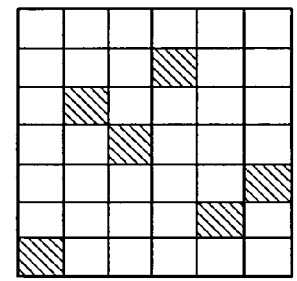
(m=0, n=1) Fig. 6(c)
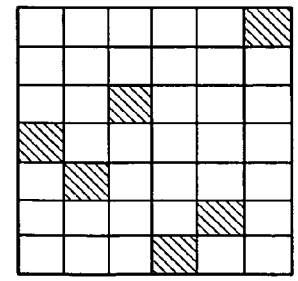
(m=1, n=0) Fig. 6(b)
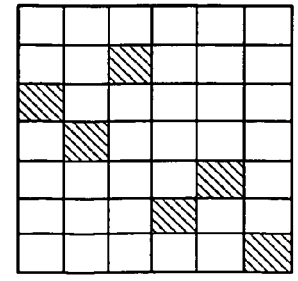
(m=0, n=0) Fig. 6(a)

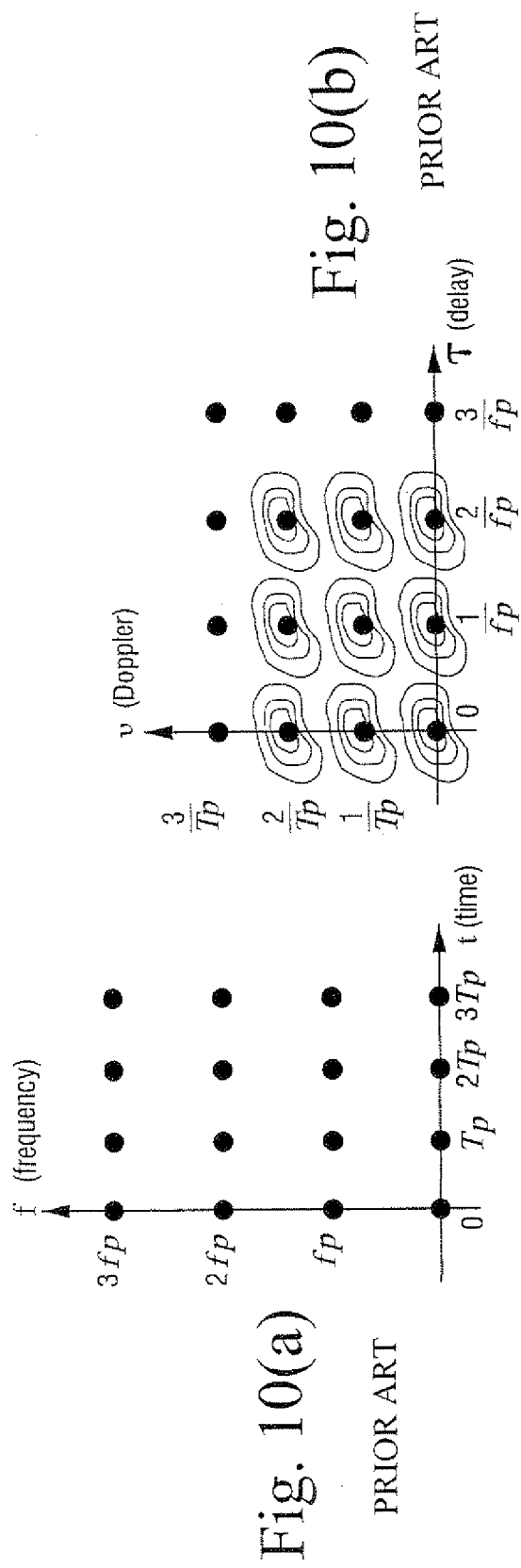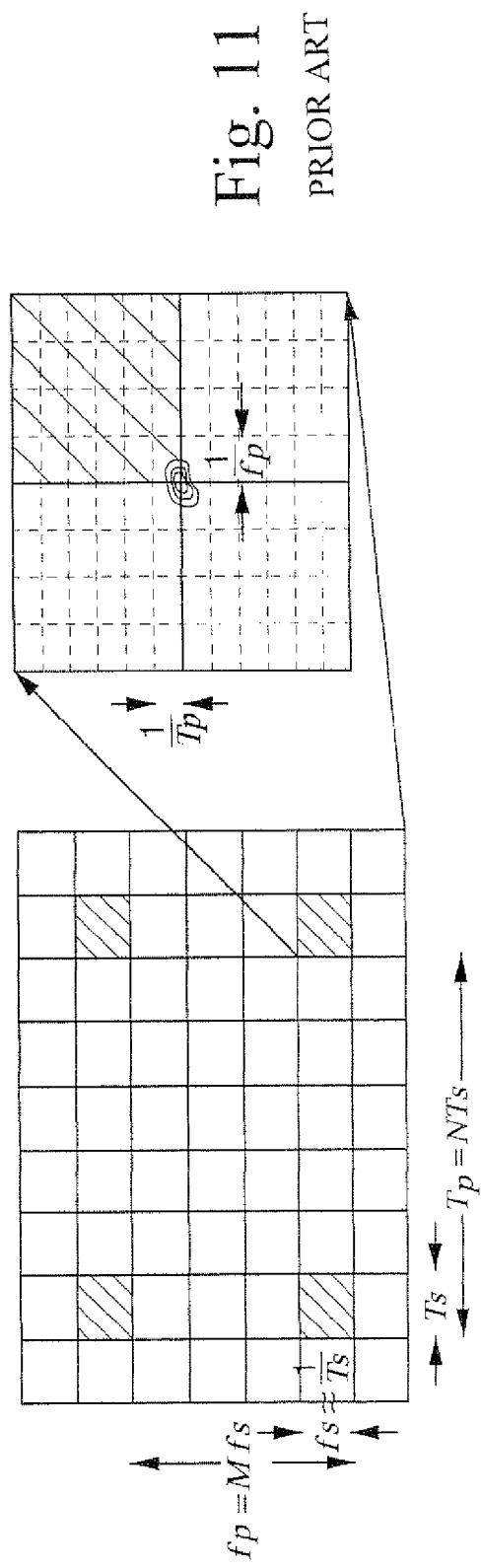

HOPPING PILOT PATTERN FOR TELECOMMUNICATIONS

BACKGROUND

1. Field of the Invention

This invention pertains to communications systems, and particularly to communication system which employ a pilot pattern for functions such as synchronization, channel estimation, and/or device identification.

2. Related Art and Other Considerations

Orthogonal frequency division multiplexing (OFDM) is a special subset of Frequency Division Multiplex (FDM) and is a multi-carrier modulation scheme. In orthogonal frequency division multiplexing (OFDM), the data is simultaneously encoded over various sub-carriers. A data stream is split into N parallel streams of reduced data rate and each parallel stream is transmitted on a separate sub-carrier. When the subcarriers have appropriate spacing to satisfy orthogonality (e.g., the sub-carriers' frequencies differ from each other by integer multiples of the base (lowest) sub-carrier frequency), the carriers are mutually orthogonal to each other and their spectra overlap.

Thus, in an Orthogonal Frequency Division Multiplexing (OFDM) system, the data symbols are modulated onto the orthogonal time-frequency units defined by the sub-carriers of an OFDM symbol. The duration of an OFDM symbol is usually designed to be short enough so that the propagation channel remains unchanged. Within each OFDM symbol, the available bandwidth is divided into a number of orthogonal sub-carriers onto which the above-mentioned data symbols are modulated.

The coherent demodulation of these data symbols at the receiver requires the knowledge of the slowly-varying complex-valued channel gain each data symbol experiences. This knowledge is usually obtained by introducing into the overall transmit waveform a known signal from which the receiver can estimate the channel gain. The design of such known signal, or pilot signal, for the purpose of coherent demodulation is one of several important tasks in the complete synchronization scheme of an OFDM system.

In addition to channel estimation, the other two major synchronization tasks are the initial time-frequency offsets synchronization and the identification of the communicating devices within the system. The former is required in the beginning of a communication session when the timing and frequency synchronization have not been established yet. The latter is required continuously by all communicating devices to detect and identify each other.

Many of the existing synchronization signal designs in the existing OFDM systems have separate pilot signals for channel estimation and initial time-frequency synchronization. In view of the two separate sets of pilot signals, these existing systems engage in a two-step (two-phase) synchronization process. In general, as a first step and for initial time-frequency synchronization and device identification a device-specific pilot signal is transmitted periodically with a certain duty cycle. This device-specific pilot can be a pseudo random sequence as used in a Code Division Multiple Access (CDMA) system, or any other signal with enough bandwidth, length and energy. The device-specific pilot signal is sometimes referred to as a preamble since it precedes the second phase, i.e., the data transmission phase. In the data transmission phase, channel estimation pilot symbols are uniformly distributed across a time frequency plane, as shown in FIG. 9. The time-frequency plot of FIG. 9 is simply an illustration of the frequency contents as a function of time for a time domain signal. Roughly speaking, the frequency component in the $m^{th}$ sub-carrier centered at $mf_s$ Hz of the $n^{th}$ OFDM symbol transmitted at time $nT_s$ sec. can be expressed by Equation 1.

$$\lambda(n,m)p(t-nT_s)e^{j2\pi mf_s t}, \quad \text{Equation (1)}$$

In Equation 1, $p(t)$ is a narrow band pulse shaping function (usually a rectangular pulse), $T_s$ is the OFDM symbol duration, $f_s \approx 1/T_s$ is the sub-carrier spacing and $\lambda(n, m)$ is the associated symbol value which is set to 1 for the channel estimation pilot symbol.

Typically, to achieve synchronization in the first phase, the receiver first matches the received signal to one of the possible preambles with a certain hypothesized time-frequency offset, and calculates a corresponding metric. The same calculation is performed for all possible preambles with all possible time-frequency offsets. The identity of the transmitter and its time-frequency offset with respect to the receiver are then determined by selecting those parameters associated with the largest metric. Thus the objectives of the first phase (device identification and initial synchronization achieved).

After the initial synchronization is established, in the data transmission phase the receiver then locates the channel estimation pilot symbols from which the channel's time-frequency response $H(t, f)$ can be interpolated for the coherent demodulation of a data symbol transmitted at time t in the sub-carrier centered at frequency f. The channel estimation pilot symbols need to be placed frequently enough in the time-frequency plane to ensure the quality of the interpolation. From the sampling point of view, this implies that the pilot symbol insertion rate should be greater than the maximum delay spread in the frequency domain and the maximum Doppler spread in the time domain such that there will be no aliasing for the channel's delay-Doppler response which is defined by Equation 2.

$$h(\tau,\nu) \triangleq \iint H(t,f)e^{j2\pi\tau f}e^{-j2\pi\nu t}dtdf. \quad \text{Equation (2)}$$

A straightforward approach to meet these requirements is to use a regularly spaced pilot pattern such as that shown in FIG. 10(a). As long as $1/T_p$ and $1/f_p$ satisfy the above-mentioned criteria, the channels delay-Doppler response (shown as contour curves in FIG. 10(b)) will be aliasing free and can therefore be recovered with a two-dimensional low pass filter (interpolator). Table 1 summarizes these notations with values from an example scenario. FIG. 11 gives a visual illustration of their relative scales in the time-frequency (or delay-Doppler) plane.

TABLE 1

Summary of Notations

| Parameter | Comment | Value (example) |
|---|---|---|
| $\bar{\tau}$ | maximal delay spread | 7.8125 μsec |
| $\bar{\nu}$ | maximal Doppler spread | 500 Hz |
| $T_p$ | pilot insertion period in time domain $(1/\bar{\nu})$ | 2 msec |
| $f_p$ | pilot insertion period in freq. domain $(1/\bar{\tau})$ | 128 kHz |
| $\bar{\nu}\bar{\tau}$ | pilot density | 1/256 |
| $T_s = T_p/N$ | OFDM symbol duration | 2/16 msec |
| $f_s = f_p/M$ | sub-carrier spacing $\left(\approx \frac{1}{T_s}\right)$ | 128/16 kHz |

The use of preambles for initial synchronization and device identification has three primary draw-backs. First of all, since these preambles are not continuously transmitted, the receiver has to keep searching until one preamble (or sometimes more if the signal is weak) is available, thereby delaying the acquisition time. Secondly, dedicating all available bandwidth over a time interval entirely to a single purpose is not an efficient way of utilizing the radio resource. The two-step (preamble followed by channel estimation pilot) solution fails to exploit the underlying OFDM structure, which allows for the precise design of the synchronization signal's time-frequency contents. Finally, the preamble may not be bandwidth scalable, which is of great importance for the future systems that may operate in a wide variety of spectrum allocation scenario.

The regularly spaced pilot, on the other hand, is more scalable since it can be easily extended in frequency and a "spectrum hole" can be created by skipping a few pilot subcarriers. The regularly spaced pilot is thus typically used only for channel estimation or perhaps for initial synchronization if the receiver is allowed to observe it over a long period of time. Only in rare instances do the pilot signals of the data transmission phase provide any type of device identification (e.g., identification of a transmitter).

For example, in U.S. Pat. No. 6,961,364 to Laroia et al., the slope of a pilot tone hopping sequence is employed to identify a transmitting base station having the strongest downlink signal. Each base station transmits a Latin Squares pilot signal with a locally unique slope. A mobile user unit performs base station identification by estimating the slope of the strongest received pilot signal. In addition, the mobile user unit can synchronize to the pilot signal by estimating its initial frequency shift. Inherent delays resulting when using a training sequence of symbols is not experienced when using the pilot tone hopping sequence to identify the base station having the strongest downlink signal.

What is needed, therefore, and an object of the present invention, is an effective and efficient system, method, and apparatus for using a single pilot pattern for plural synchronization tasks, including device identification.

BRIEF SUMMARY

In a telecommunications system and method of operating the same, each of plural communicating devices is identified by a permutation of a time-frequency pattern of signals transmitted from the device. The permutation of the time-frequency pattern results either in the time-frequency pattern itself or a cyclic shifting of the time-frequency pattern. The time-frequency pattern preferably includes hopped pilot signals which are hopped either in a frequency domain or a time domain. Preferably, the hopped pilot signals are hopped in accordance with a Costas sequence, which Costas sequence can be repeated for one or more periods to accommodate a number of pilot signals in one of the time domain and the frequency domain. The hopped pilot signals can be hopped in accordance with a perfect periodic Costas sequence configured by augmenting a Welsh-constructed periodic Costas array with an empty row or an empty column. The device identified by the permutation of a time-frequency pattern can be a radio access network node or a wireless mobile station, for example.

In accordance with one aspect of the technology, a transmitter of a telecommunications system transmits hopped pilot signals as a distinct time-frequency shift of a time frequency plane array wherein the pilot signals are hopped using a hopping sequence. Differing transmitters of the system transmit using different time-frequency shifts of the time frequency plane array.

In another aspect of the technology, a receiver identifies a transmitter from which the receiver obtains signals by detecting the particular time-frequency shift of the time frequency plane array and associating the particular time-frequency shift with the originating transmitter.

Preferably the hopping sequence upon which the time frequency plane array is based is configured so that any two time-frequency shifts of the time frequency plane array has a predetermined number of coincidences. The predetermined number of coincidences can be zero or a positive integer (e.g., a non-negative integer). In an example, illustrated embodiment, the predetermined number of coincidences is one. Preferably, the hopping sequence is a Costas sequence, and can be a perfect periodic Costas sequence (configured by augmenting a Welsh-constructed periodic Costas array with one of an empty row and an empty column, i.e., an empty row or an empty column).

In an example embodiment, the pilot signals of the hopped time frequency plane array are for providing channel estimation and the hopped time frequency plane array itself is configured for providing device identification. The pilot signals are hopped with respect to one of time and frequency, but not both.

The transmitter and receiver can be arranged for engaging in orthogonal frequency division multiplexing (OFDM) communication. Further, the transmitter and receiver compatible with the time-frequency shifting of the hopped pilot pattern can be employed in various example contexts or implementations, such as a radio access network (e.g., UTRAN, for example). As such, the transmitter can be included in a fixed node of the radio access network and the receiver incorporated into a mobile node such as a mobile station or user equipment unit. Conversely or additionally, the mobile node may include a transmitter compatible with time-frequency shifting of its hopped pilot pattern and the fixed network node may include a receiver compatible with time-frequency shifting of its hopped pilot pattern.

As another aspect of the technology, a telecommunications node comprises plural transmitters or plural antennas, e.g., a first antenna and a second antenna. The first antenna transmits hopped pilot signals as a first locally unique time-frequency shift of a time frequency plane array wherein the pilot signals are hopped using a hopping sequence. The second antenna transmits hopped pilot signals as a second locally unique time-frequency shift of the same time frequency plane array. Such multiple-antenna/multiple transmitter node can be a fixed node (e.g., of a radio access network) or a mobile node (such as a mobile station).

Thus, without disrupting the overall signal structure, the disclosed pilot pattern of the technology contains enough information for the receiver to achieve all major synchronization tasks with minimum overhead. The technology applies to both the uplink and downlink in a cellular system. Therefore, the device or communicating entity mentioned thereafter can be a base station, a radio access point, a terminal, or one of the transmit antennas connected to it.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3(a) is a diagrammatic view illustrating four repetitions of a time frequency plane array having a regularly spaced pilot; FIG. 3(b) is a diagrammatic view illustrating four repetitions of a time frequency plane arrays resulting from employment of a particular hopping sequence relative to the time frequency plane array of FIG. 3(a).

FIG. 4(a) is a diagrammatic view of a time frequency plane array for a Costas array created by a particular permutation sequence; FIG. 4(b) is a diagrammatic view of a time frequency plane array having two sets of the Costas array of FIG. 4(a), the two sets being superimposed and time-frequency shifted; FIG. 4(c) is a diagrammatic view of two sets of the Costas array of FIG. 4(a), each of the two sets comprising four periods or repetitions and being superimposed and time-frequency shifted.

FIG. 5(a) is a diagrammatic view of a time frequency plane array having two sets Perfect Periodic Costas arrays, each of the two sets comprising four periods or repetitions and being superimposed and time-frequency shifted; FIG. 5(b) is a periodic side lobe distribution array for the Perfect Periodic Costas array of FIG. 5(a).

FIG. 6(a)-FIG. 6(d) are diagrammatic views of different cyclic time-frequency shifts of the Costas array of FIG. 4(a).

FIG. 10(a) is a diagrammatic view of a regularly spaced pilot pattern.

FIG. 10(b) is a diagrammatic view of a Fourier transform of the pilot pattern of FIG. 10(a).

FIG. 11 is a diagrammatic view of relative scales of the pilot pattern of FIG. 10(a) in the time-frequency plane.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
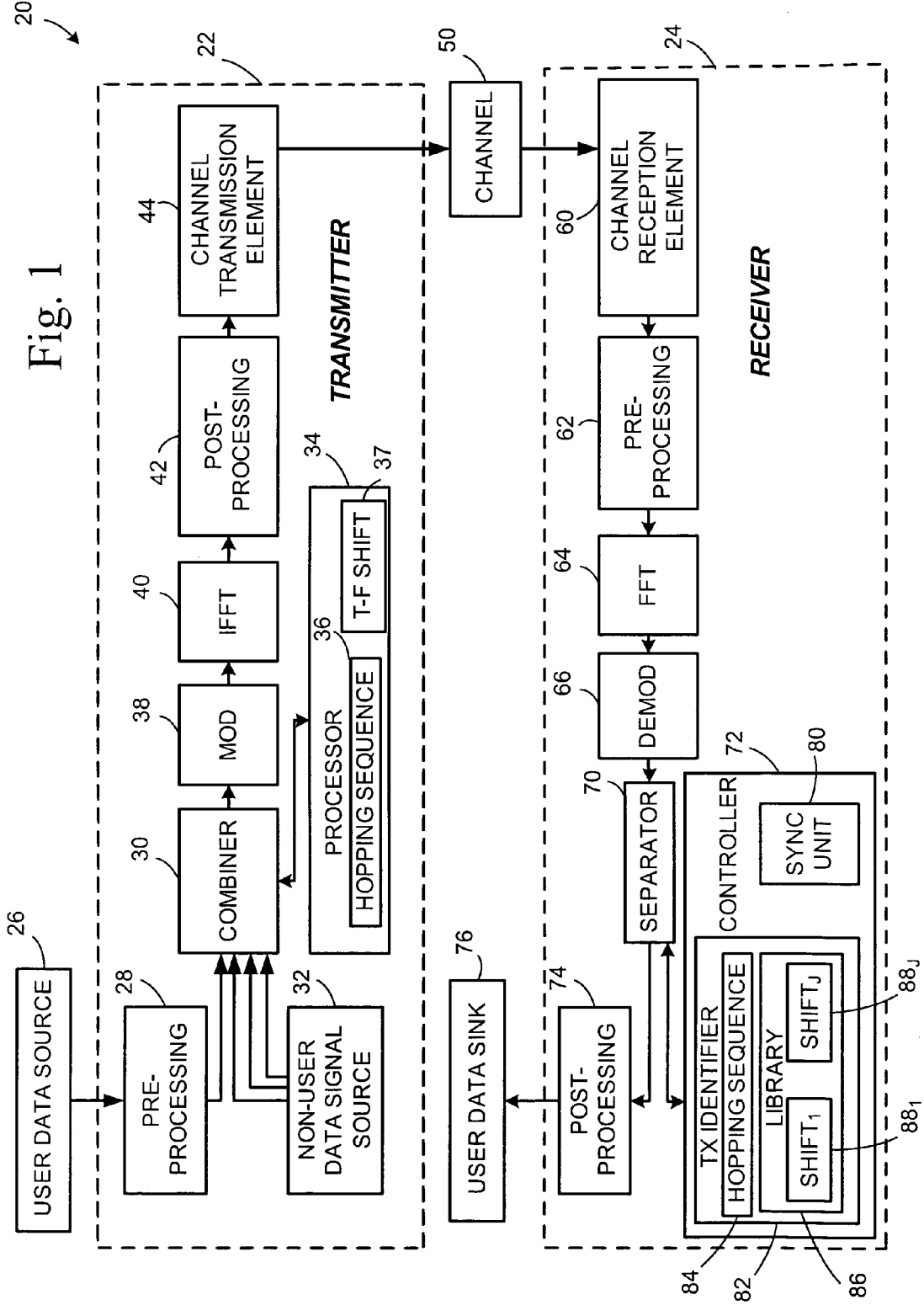
FIG. 1 is a schematic view of an orthogonal frequency division multiplexing (OFDM) system according to an example embodiment, including an OFDM transmitter 22 and an OFDM receiver 24.

FIG. 1 shows an example, non-limiting embodiment of an orthogonal frequency division multiplexing (OFDM) system 20 wherein, for transmissions from a transmitter 22 to a receiver 24, a single pilot pattern is employed for performing plural, and preferably substantially all, synchronization tasks. As explained below, the multi-purpose pilot pattern can be achieved by hopping the regularly spaced channel estimation pilot in a manner such that (1) the non-aliasing property is preserved while, at the same time, (2) the different acceptable hopping patterns of respective different transmitters can be used for device identification. Since the resulting pilot pattern is a permuted version of the regularly spaced pattern and there is no need for any additional preamble, the pilot overhead for all the synchronization tasks can be kept at minimum.

The OFDM transmitter 22 of the orthogonal frequency division multiplexing (OFDM) system 20 of FIG. 1 receives user data from a user data source 26. Optionally, and depending on the particular implementation, OFDM transmitter 22 comprises a pre-processing section 28 which can manipulate the user data obtained from user data source 26 by performing such optional functions as serial-to-parallel conversion and channel coding and interleaving.

The OFDM transmitter 22 comprises a combiner 30 which combines the user data (optionally coded and/or interleaved) with non-user data signals such as control signals, synchronization signals, framing signals, and pilot signals. In FIG. 1, such control signals, synchronization signals, framing signals, and pilot signals are shown as being applied or received from a non-user data signal source 32. The combiner 30, which can be a multiplexer or function as a multiplexer, generates a bit stream by controlled introduction of the non-user data signals into the stream of user data.

Control of introduction of the non-user data signals, including pilot signals, is achieved by controller 34. As illustrated in FIG. 1, controller 34 includes, e.g., a memory, register, or other suitable storage element which contains a hopping sequence 36 uniquely associated with the particular OFDM transmitter 22, as well as a memory, register, or other suitable means for designating a locally unique time-frequency shift 37 for a time frequency plane array which is configured using the hopping sequence 36.

The bit stream output by combiner 30 is modulated by modulator 38 onto a series of sub-carriers. As understood by those skilled in the art, the modulation performed by modulator 38 essentially maps groups of bits to a series of constellation points, represented as complex numbers. A parallel-to-serial conversion may be performed on the complex numbers output by modulator 38 prior to application to an Inverse Fast Fourier Transform (IFFT) unit 40. The Inverse Fast Fourier Transform (IFFT) unit 40 transforms the modulated carriers into a sequence of time domain samples.

The sequence of time domain samples output by Inverse Fast Fourier Transform (IFFT) unit 40 may undergo more processing functions by an optional post-processor 42. Such post-processing functions can include one or more of cyclic extension, windowing, peak control, all of which are understood by the person skilled in the art. The resultant OFDM waveform is applied to a channel transmission element 44. The channel transmission element 44, which can be an antenna or antenna system, for example, applies the OFDM waveform (I, Q output or digital IF signals) to channel 50.

The channel 50 can be any suitable transmission medium, such as a radio frequency, for example. As a matter of fact, one example, non-limiting implementation of orthogonal frequency division multiplexing (OFDM) system 20 is in context of a cellular transmission system in which wireless communications occur between a radio access node such as a base station (also called a Node-B), for example, and a mobile unit (often also termed a mobile station, a mobile terminal, or a user equipment unit (UE), among other appellations). In a wireless system, the wireless receiver can be embodied in or realized as mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the receivers can be embodiment or implemented in as fixed wireless devices, e.g., fixed cellular devices/terminals which are part of a wireless local loop or the like. In any event, the OFDM waveform is transmitted over channel 50, which has its own transmission function (as affected by properties of the channel and factors such as noise and interference, for example).

The example, non-limiting embodiment of OFDM receiver 24 shown in FIG. 1 comprises a channel reception element 60. For a wireless system, channel reception element 60 can be an antenna or antenna system. The OFDM waveform (I, Q input or digital IF signals) as received by channel reception element 60 is applied to an optional pre-processing section 62. The pre-processing section 62 removes carrier offset caused by transmit and receiver local oscillator differences and selects an appropriate sequence of samples to apply to Fast Fourier Transform (FFT) unit 64. The Fast Fourier Transform (FFT) unit 64 converts the time domain waveform to the frequency domain, after which an optional serial to parallel conversion may be performed. With the correct timing instant, the individual sub-carriers are demodulated by demodulator 66. The output of demodulator 66 is applied to separator 70. The separator 70 sorts user data signals from non-user data signals, and may take the form of a demultiplexer or the like. Whatever form it takes, separator 70 is governed by a detector or controller 72. The detector 72 is configured to detect non-user data signals such as pilot signals, for example, and to control gating or routing of signals out of separator 70 in accordance with its determination.

User data signals gated out of separator 70 can be applied to an optional post-processing section 74. The post-processing section 74 can perform such functions as channel decoding, de-interleaving, and parallel-to-serial conversion, as appropriate. The user data thusly obtained is applied to a user data sink 76, which can be a voice, text, or other type of application, for example.

As previously indicated, the non-user data signals in the demodulated data stream are detected and used by controller 72. Among the non-user data signals are pilot signals. The demodulated pilot signals are particularly applied to both receiver synchronization unit 80 and transmitter identifier 82. The transmitter identifier 82 includes transmitter discrimination logic; a memory 84 or other element for storing the hopping sequence; and a library 86 of time-frequency shifts. The library 86 of time-frequency shifts can be embodied in a memory, register, or other storage device, and includes plural time-frequency shift patterns for potential association with corresponding plural OFDM transmitters. As shown in FIG. 1, the time-frequency shift patterns of library 86 include time-frequency shift patterns $88_1$ through $88_j$.

A transmitter of an orthogonal frequency division multiplexing (OFDM) system such as OFDM transmitter 22 transmits data and hopped pilot signals as a distinct (i.e., locally unique) time-frequency shift of a time frequency plane array wherein the pilot signals are hopped using a hopping sequence. As used herein, "locally unique" includes the notion that a receiver capable of receiving OFDM signals from the transmitter would not be capable of or positioned to receive signals from another transmitter having the same time-frequency shift. Differing transmitters of the system preferably transmit using different time-frequency shifts of the time frequency plane array. The OFDM transmitter 22 of FIG. 1 knows which hopping sequence to employ to generate the time frequency plane array in view of its storage of the hopping sequence in memory 36, and further knows how to perform its signature time-frequency shift the time frequency plane array thusly created in view of its storage of the time-frequency shift pattern 37.

In another aspect of the technology, a receiver such as OFDM receiver 24 identifies a transmitter from which the receiver obtains orthogonal frequency division multiplexing (OFDM) signals by detecting the particular time-frequency shift of the time frequency plane array and associating the particular time-frequency shift with the originating transmitter. In this regard, upon detecting the time frequency plane array of its received signals, the controller 72 (which knows the hopping sequence employed to generate the time frequency plane array) can determine how the time frequency plane array has been time-frequency shifted, and upon determining the pattern of the shift can associate the received signals with one of the transmitters for which the receiver 24 has stored time-frequency shift patterns 88 in its library 86.

Preferably the hopping sequence upon which the time frequency plane array is based is configured so that any two time-frequency shifts of the time frequency plane array has a predetermined number of coincidences. The predetermined number of coincidences can be zero or a positive integer (e.g., a non-negative integer). In an example, illustrated embodiment, the predetermined number of coincidences is one. As explained in more detail below, preferably the hopping sequence is a Costas sequence, and can be a perfect periodic Costas sequence (configured by augmenting a Welsh-constructed periodic Costas array with one of an empty row and an empty column, i.e., an empty row or an empty column). The following provides a preface for, among other things, understanding such configuration or selection of the hopping sequence and the time-frequency shifting of the time frequency plane array.

Figure 2A:
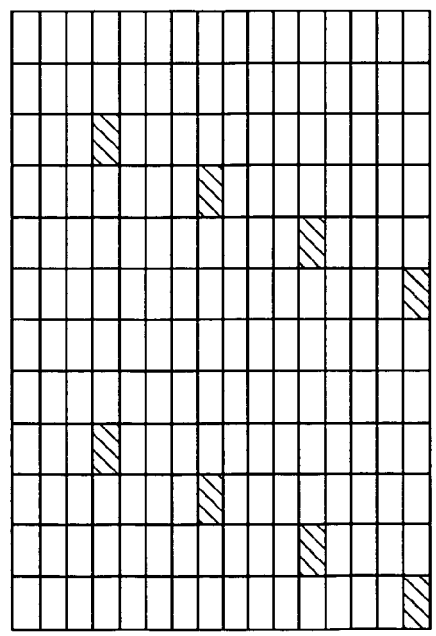
FIG. 2(a) and FIG. 2(b) are diagrammatic views illustrating time frequency plane arrays respectively depicting two side-by-side repetitions and three side-by-side repetitions of differing pilot patterns.
Figure 2B:
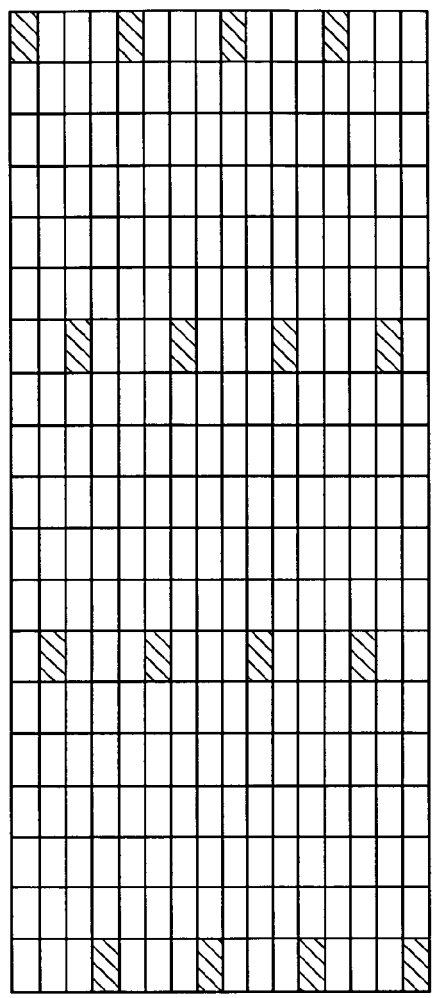
Figure 9:
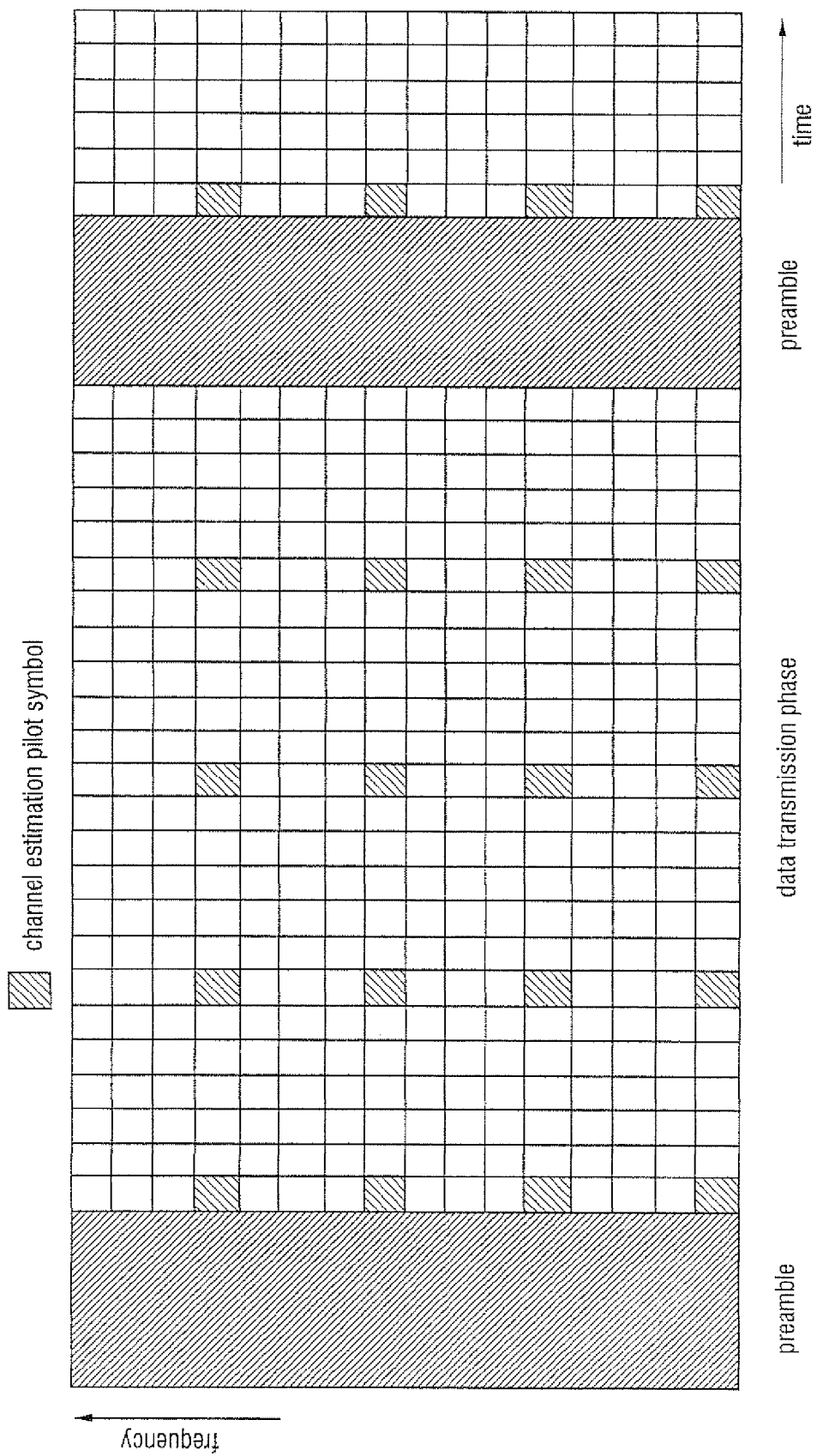
FIG. 9 is a diagrammatic view of a two-step synchronization design wherein a preamble of a first phase is followed by a data transmission phase.

To begin, FIG. 2(a) and FIG. 2(b) respectively illustrate two side-by-side repetitions and three side-by-side repetitions of differing pilot patterns as depicted by time frequency plane arrays. In each time frequency plane array, the OFDM channel is represented as a time-frequency grid, i.e., plane. Each column of the grid represents the time interval for one OFDM symbol interval, and each OFDM symbol is comprised of a number of tones. Each block of the grid which is hatched represents transmission of pilot signals; each non-hatched block of the grid represents transmission of, e.g., user data. In the example of FIG. 2(a) and FIG. 2(b), there are six symbol intervals in each repetition, and sixteen tones in each symbol interval. The tones are numbered along the frequency axis and the symbol intervals, i.e., periods, are numbered along the time axis. FIG. 2(a) shows that the pilot signals can be shifted horizontally, e.g., time hopped. FIG. 2(b) shows, alternatively, that the pilot signals can be shifted vertically, e.g., frequency hopped. How the pilot signals of FIG. 2(a) and FIG. 2(b) are shifted are understood with respect to the positions of the pilot signals in the data transmission phase of FIG. 9. Thus, FIG. 2(a) and FIG. 2(b) show that shifting either horizontally or vertically (but not both) any scan line by an arbitrary displacement in the regularly spaced pilot pattern still preserves the non-aliasing condition. Alternative pilot patterns with better properties may be found from these time-frequency shifted patterns. Without loss of generality, only horizontally shifted, or time-hopping, patterns are discussed hereinafter, it being understood that the technology also applies to vertically shifted or frequency-hopping patterns as well. The extension to its frequency domain counterpart is straightforward.

Equation 3 provides a mathematical formulation for a base signal c(t) derived from time-hopping a segment of a vertical scan line in the regularly spaced pilot pattern:

$$c(t) = \sum_{l=0}^{L-2} p(t - \tau_l \delta T_s) e^{j2\pi l f_p t}, \quad \text{Equation (3)}$$

In Equation 3, $\tau_l$ are distinct integers ranging from 0 to L−1 and δ is an arbitrary integer. In other words, the delay hopping pattern $\{\tau_0, \tau_1, \ldots, \tau_{l-1}\}$ is one of the L! permutations of the integer set $\{0, 1, \ldots, L-1\}$. The regularly spaced pilot is a special case of Equation 3 in which $\tau_l$=0 for all l.

A pilot signal designed in accordance with the present technology can be expressed as shown in Equation 4 as the repetition of the base signal c(t) in both time and frequency:

$$s_p(t) = \sum_{m=-\infty}^{\infty} \sum_{n=-\infty}^{\infty} c(t - nT_p) e^{j2\pi m F_p t}, \quad \text{Equation (4)}$$

In Equation 4, $F_p$=$Lf_p$=$LMf_s$ and $T_p$=$NT_s$ are the frequency and time domain periods of this repetition respectively. The latter is also the pilot insertion period of the regularly spaced pilot given in Table 1. However, the frequency domain period here is L times that of the regularly spaced pilot due to the length-L time-hopping sequence.

FIG. 3(b) shows an example hopped time frequency plane array resulting from Equation 4 with N=7, M=4, L=6, δ=1 and wherein the sequence is as shown in Expression 5.

$$\{\tau_0, \tau_1, \ldots, \tau_5\} = \{0,2,1,5,3,4\} \quad \text{Expression (5)}$$

The pattern of FIG. 3(b) shows 4 repetitions of the base signal, and is a time-hopped version of the regularly spaced pilot of FIG. 3(a). From FIG. 3(b) it is clear that a pilot pattern constructed this way meets the two-dimensional Nyquist criteria since the time hopping as a function of frequency is just horizontal scan line shifts of the regularly spaced pilot pattern.

The permutation sequence given in Expression (5) is a special sequence called "Costas sequence". Costas sequence was first discovered in the design of delay-Doppler radar signal. See, e.g., J. P. Costas, "A Study of a Class of Detection Waveforms Having Nearly Ideal Range+Doppler Ambiguity Properties," *Proceedings of the IEEE*, Vol. 72, No. 8, August 1984, pp. 996-1009, which is incorporated by reference herein in its entirety. It is sometimes referred to as a "Costas Array" when displayed as an L×L array with markings at ($\tau_l$, l) for l=0, ..., L−1, as shown in FIG. 4(a). This more compact array representation does not reflect the absolute scale. In other words, the actual frequency separation between two contiguous rows may be several sub-carriers as shown in FIG. 3. Similarly, the actual time separation between two contiguous columns may be several OFDM symbols ($T_s$) if δ is greater than 1.

A Costas Sequence $\{\tau_0, \ldots, \tau_{L-1}\}$ has the special property that for any given n≠0, $\tau_m - \tau_{m-n}$ are distinct for all m within the range. This property ensures that any time-frequency shifted Costas array has at most one coincidence with the original pattern, as shown in FIG. 4(b).

The sequence given in Expression (5) belongs to a special category of Costas sequences derived algebraically using the Welch construction $W_1$. The Welch construction is described in, e.g., Golomb, Solomon W., and Taylor, Herbert, "Construction and Properties of Costas Arrays", *Proceedings of the IEEE*, Vol. 72, No. 9, September 1984, pp. 1143-1163, which is incorporated by reference herein in its entirety. When used periodically, the cyclic time-frequency shift of this special category of Costas sequences has at most two coincidences with the original pattern, as shown in FIG. 4(c). The Welch construction ($W_1$) category of Costas array exists for any integer L if L+1 is a prime.

It is further discovered that if an empty column or an empty row is appended to each period of the Welch-constructed periodic Costas Array, there is at most one coincidence between any cyclic time-frequency shifted pattern and the original one. FIG. 5(a) illustrates use of the Costas sequence for time-hopping the elements in a vertical scan, and accordingly shows addition of an empty column for formation of a Perfect Periodic Costas Array. FIG. 5(b) shows a corresponding periodic side lobe array where the number in the $n^{th}$ row of the $m^{th}$ column corresponds to the number of coincidences per period between the original pattern and its cyclic shifted version with m units of offset in time and n units of offset in frequency. Such type of extension will be referred to as a Perfect Periodic Costas Array since there can be no further side lobe reduction. It should be understood that in the example of FIG. 5(a) and FIG. 5(b) an empty column is added to form the Perfect Periodic Costas Array since the Costas sequence is used for time-hopping the elements in a vertical scan. In other examples in which the Costas sequence is used for frequency-hopping the elements in a horizontal scan, an empty row is added to form the appropriate Perfect Periodic Costas Array.

Therefore, one can use different cyclic time-frequency shifts of a Costas array as base signals to identify different devices. In the case of Perfect Periodic Costas Array, there are a total of L(L+1) distinct cyclic time-frequency shifts. Using the same L=6 examples, some of them are shown in FIG. 6(a)-FIG. 6(d).

From the foregoing it will be understood that a OFDM receiver such as receiver 24 of FIG. 1, upon receiving signals corresponding to any one of the four time frequency plane arrays of FIG. 6(a)-FIG. 6(b), is able to identify which particular OFDM transmitter originated the signals. For example, upon receiving signals corresponding to the time frequency plane array of FIG. 6(b), the controller 72 of OFDM receiver 24, knowing the hopping sequence, would determine that the received time frequency plane array has a time shift of 1 (m=1) and no frequency shift (n=0).

The controller 72 can then search its library 86 for the shift pattern and, by associating the shift pattern with a transmitter, determine the transmitter from which the OFDM receiver 24 is receiving the OFDM signals.

The frequency shift does not have to be a multiple of $f_p$ in Equation 3. Since $f_p$ is shown as a multiple by the notation M of the sub-carrier spacing $f_s$, the shift can (but does not have to) be a multiple of $f_s$. When two patterns have a relative frequency shift that is not a multiple of $f_p$, they have no coincidence at all. Hence, the predetermined number of coincidences can be zero or a positive integer (i.e., a non-negative integer).

From the foregoing it will be appreciated that the hopping sequence can be periodic. For example, if there are more pilots in a scan line than the length of the Costas sequence, the hopping can be repeated as illustrated, e.g., in FIG. 4(c) where there are four periods of the basic Costas array (two periods in the time domain and two periods in the frequency domain). In the time domain, the hopping pilot pattern can repeat indefinitely. In the frequency domain, on the other hand, the number of repetitions will be limited by the bandwidth. If necessary, the last repetition may need to wrap around. Viewed, e.g., in this manner, the time-frequency shift of the hopping sequence can be viewed as a cyclic or circular shift, as hereinbefore expressed.

Thus, as understood from the foregoing, each of plural communicating devices of a telecommunications system can be identified by a permutation of a time-frequency pattern of signals transmitted from the device. The permutation of the time-frequency pattern results either in the time-frequency pattern itself (a null permutation) or a cyclic shifting of the time-frequency pattern. The time-frequency pattern preferably includes hopped pilot signals which are hopped either in a frequency domain or a time domain. Preferably, the hopped pilot signals are hopped in accordance with a Costas sequence, which Costas sequence can be repeated for one or more periods to accommodate a number of pilot signals in one of the time domain and the frequency domain. The hopped pilot signals can be hopped in accordance with a perfect periodic Costas sequence configured by augmenting a Welsh-constructed periodic Costas array with an empty row or an empty column. The device identified by the permutation of a time-frequency pattern can be a radio access network node or a wireless mobile station, for example.

The disclosed pilot pattern can be used in either reservation or non-reservation approaches. The reservation mode reserves a subset of the sub-carriers (every $M^{th}$ sub-carrier, for example) exclusively for the pilot. The non-reservation mode allows data to be transmitted in sub-carriers that are used by other devices as pilots. To maintain the same performance in the non-reservation mode, however, the pilot has to be transmitted at higher power than the data. It is also possible to use more than one subset of sub-carriers for pilot if required. For example, the first subset includes every $M^{th}$ sub-carriers while the second one includes every $M^{th}$ plus 1 sub-carriers. In this case, the two sets are completely orthogonal to each other and free of interference.

The preceding discussion has assumed that the pilot pattern is transmitted in a time-frequency plane array that also includes user data (e.g., non-pilot data). Such need not necessarily be the case, since in some systems (or some modes of operations in some systems) the time-frequency plane array may contain essentially only the hopped pilot pattern and thereby serve more limited purposes (such as providing device identification without having to be accompanied by, e.g., user data).

The pilot patterns described herein which facilitate device identification by permutation of a time-frequency pattern of signals transmitted from the device is not limited to applications or implementations involving orthogonal frequency division multiplexing (OFDM). Rather, principles of the signal set as described herein are suitable for any communication system to achieve synchronization and device identification, and is not confined to any specific data transmission technique such as OFDM, CDMA or TDMA. The signal can actually be used as preamble in all these techniques if not repeated continuously and if not mingled with data transmission.

Figure 7A:
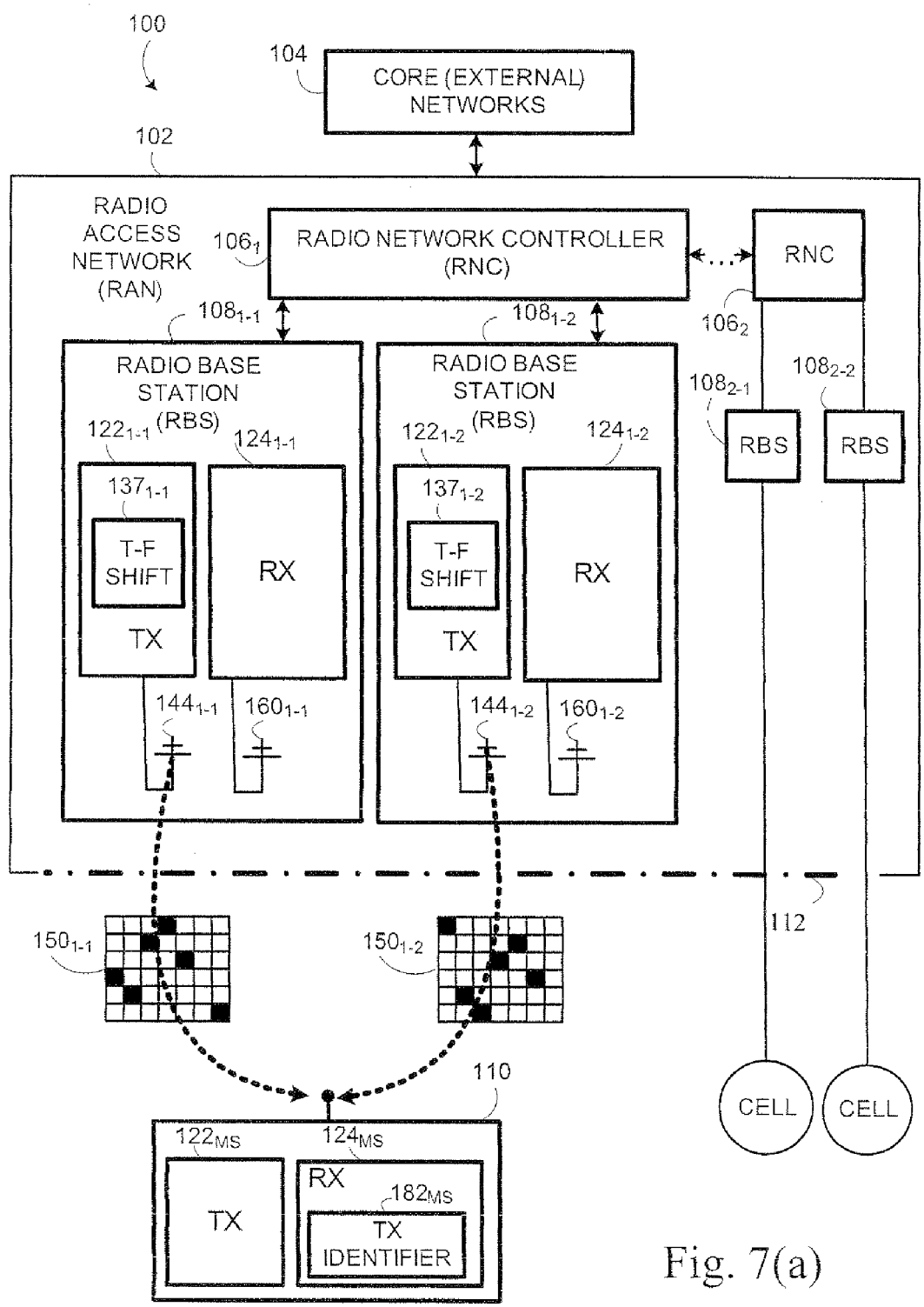
FIG. 7(a) and FIG. 7(b) are schematic views illustrating an example radio access network which employs a time-frequency shift for expressing a hopped pilot pattern.

FIG. 7(a) illustrates one example environment of use for the pilot pattern technology described herein, e.g., a wireless cellular telecommunications network 100 having a radio access network (RAN) 102. The RAN 102 is typically connected to core or external network(s) 104. The RAN 102 may include one or more base station controllers or radio network controllers (RNCs) 106 and one or more base stations (BS) 108. For sake of simplicity, the RAN 102 of FIG. 7(a) is shown with only two RNC nodes, particularly RNC $106_1$ and RNC $106_2$. Each RNC 106 is connected to one or more base stations (BS) 108. For example, and again for sake of simplicity, two base station nodes are shown connected to each RNC 106. In this regard, RNC $106_1$ serves base station $108_{1-1}$ and base station $108_{1-2}$, while RNC $106_2$ serves base station $108_{2-1}$ and base station $108_{2-2}$. It will be appreciated that a different number of base stations can be served by each RNC, and that RNCs need not serve the same number of base stations. Moreover, FIG. 7(a) shows that an RNC can be connected to one or more other RNCs in the RAN 102. Further, those skilled in the art will also appreciate that a base station is sometimes also referred to in the art as a radio base station, a node B, or B-node.

In the illustrated embodiment of FIG. 7(a), for sake of simplicity each base station 108 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers. A mobile station (MS), such as user equipment unit (UE) 110 shown in FIG. 7(a), communicates with one or more cells or one or more base stations (BS) 108 over a radio or air interface 112.

FIG. 7(a) shows that the base stations 108 may each comprise a transmitter 122 similar to that of transmitter 22 of the example embodiment of FIG. 1, and a receiver 124.

Transmitter 122 of each base station 108 includes logic and/or information for generating its locally unique time-frequency shift 137. For example, base station $108_{1-2}$ includes logic and/or information for generating its locally unique time-frequency shift $137_{1-2}$. The signals transmitted from antenna $144_{1-2}$ of base station $108_{1-2}$ include a hopping pilot sequence reflected by pattern $150_{1-2}$ shown in FIG. 7(a) for uniquely identifying base station $108_{1-1}$. The hopping pilot sequence reflected by pattern $150_{1-1}$ happens to be the same pattern as depicted in FIG. 6(b). On the other hand, base station $108_{1-2}$ includes logic and/or information for generating its locally unique time-frequency shift $137_{1-2}$. The signals transmitted from antenna $144_{1-2}$ of base station $108_{1-2}$ include a hopping pilot sequence reflected by pattern $150_{1-2}$ for uniquely identifying base station $108_{1-2}$. The hopping pilot sequence reflected by pattern $150_{1-2}$ happens to be the same pattern as depicted in FIG. 6(c).

FIG. 7(a) further shows that the receivers 124 of the base stations 108 may each comprise antenna. For example, receiver $124_{1-1}$ of base station $108_{1-1}$ comprises antenna $160_{1-1}$ and receiver $124_{1-2}$ of base station $108_{1-2}$ comprises antenna $160_{1-2}$.

The mobile station 120 typically includes a transmitter $122_{MS}$ and a receiver $124_{MS}$. As shown in FIG. 7(a), the receiver $124_{MS}$ includes a transmitter identifier $182_{MS}$ which functions essentially in the same manner as the transmitter identifier $82_{MS}$ of FIG. 1 for determining from which transmitter (e.g., whether from base station $108_{1-1}$ or $108_{1-2}$ received signal originates. As explained previously, the transmitter identifier $182_{MS}$ which makes the determination based on the time-frequency shift of the received signal. For example, when receiving a signal having a hopping pilot of the pattern $150_{1-1}$, the transmitter identifier $182_{MS}$ realizes that the signal is received from base station $108_{1-1}$. On the other than, when receiving a signal having a hopping pilot of the pattern $150_{1-2}$, the transmitter identifier $182_{MS}$ realizes that the signal is received from base station $108_{1-2}$.

Figure 7B:
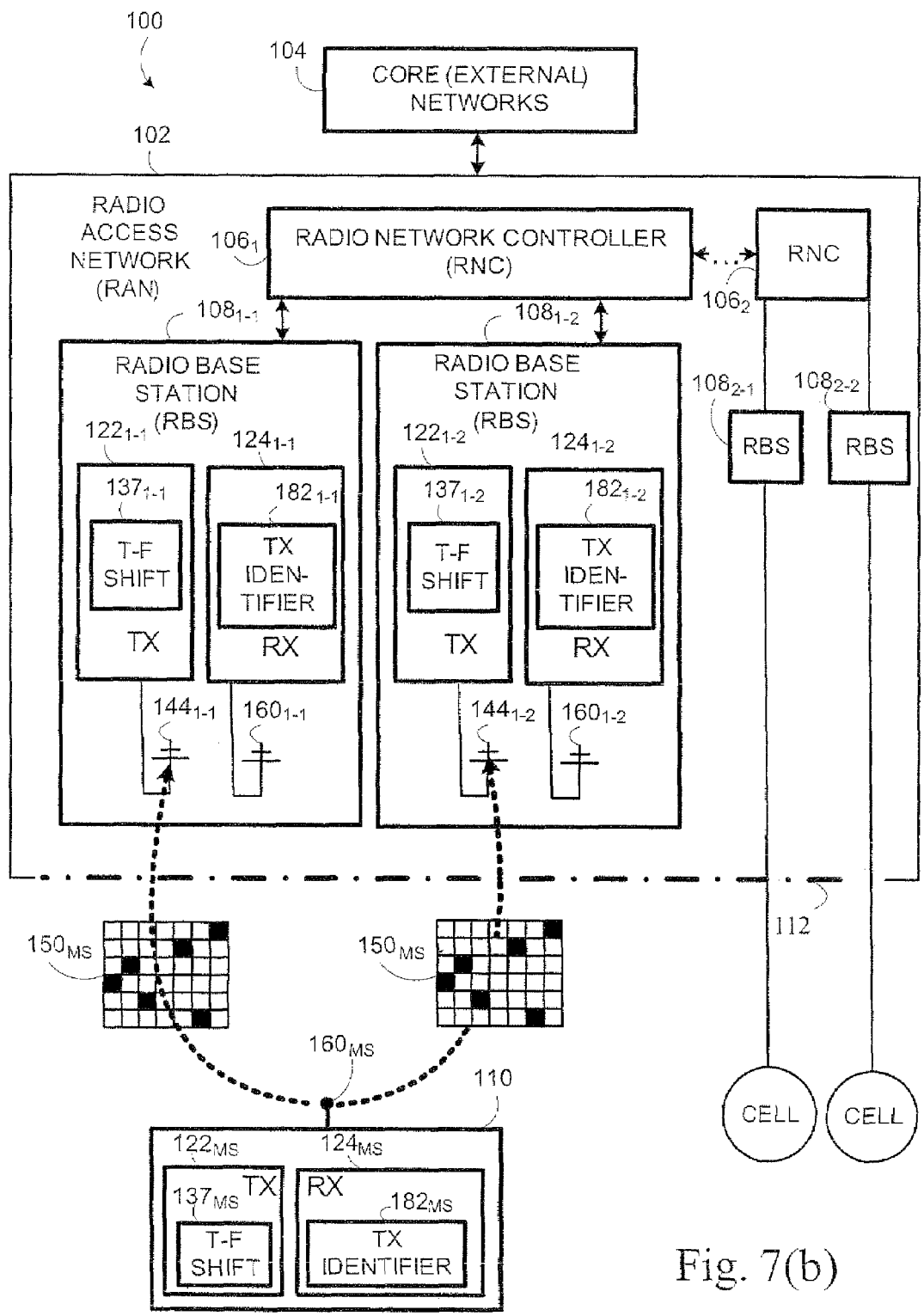

FIG. 7(b) illustrates that the time-frequency shift of the hopping pilot pattern can optionally be utilized in two-way communication between a base station 108 and the mobile station 110. In the example optional implementation of FIG. 7(b), the transmitter $122_{MS}$ of mobile station 110 is provided with a processor or other element which implements a signatory time-frequency shift of the hopping pilot pattern. Accordingly, transmitter $122_{MS}$ of the mobile station 110 of FIG. 7(b) is provided with logic and/or information for generating its locally unique time-frequency shift $137_{MS}$. To facilitate reception of the time-frequency shifted hopping pilot pattern of the mobile stations it serves, each base station 108 can be provided with a transmitter identifier 182. Accordingly, the receiver $124_{1-1}$ of base station $108_{1-1}$ is shown with transmitter identifier $182_{1-1}$ and receiver $124_{1-2}$ of base station $108_{1-2}$ is shown with transmitter identifier $182_{1-2}$. Using its transmitter identifier 182, each base station 108 can determine the particular mobile station from which it receives signals base on the signatory time-frequency shift of its signals as imposed by the originating mobile station.

Figure 8:
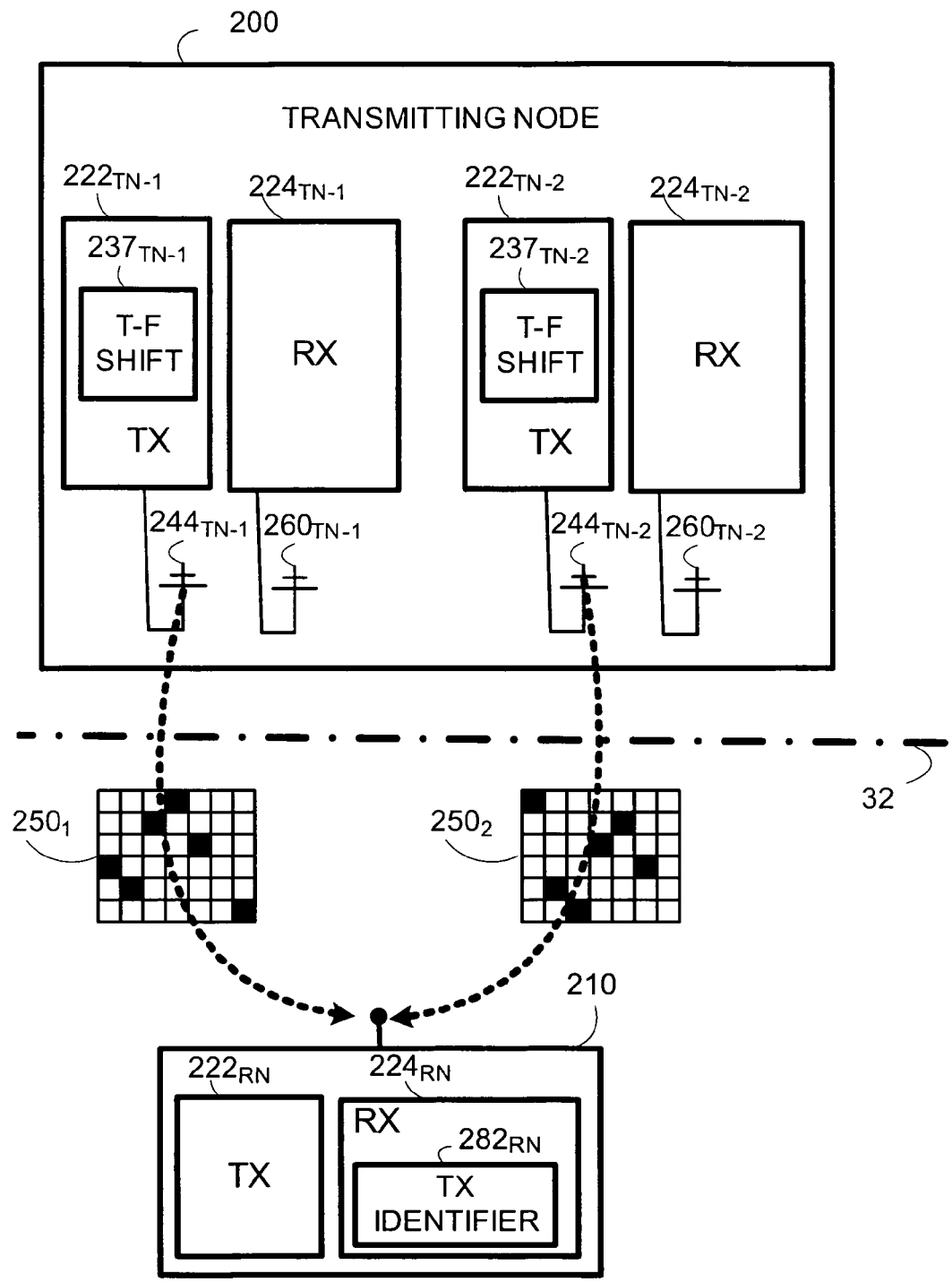
FIG. 8 is a schematic view illustrating an example implementation wherein a single node device has plural transmitters/antennas, each utilizing a different time-frequency shift for expressing a hopped pilot pattern.

FIG. 8 illustrates another example implementation of the pilot pattern technology wherein a transmitting node (TN) 200 has multiple transmitters 222 and/or multiple antennas 244. In particular, the transmitting node 200 has antenna $244_{TN-1}$ and antenna $244_{TN-2}$. The pilot signals applied to antenna $244_{TN-1}$ and broadcast by transmitting node 200 from antenna $244_{TN-1}$ are configured in accordance with first time-frequency shift, while the pilot signals applied to antenna $244_{TN-2}$ and broadcast by transmitting node 200 from antenna $244_{TN-2}$ are configured in accordance with second time-frequency shift. In FIG. 8, the pilot signals applied to antenna $244_{TN-1}$ and broadcast by transmitting node 200 from antenna $244_{TN-1}$ happen to be of the same pattern as depicted in FIG. 6(b). On the other hand, the pilot signals applied to antenna $244_{TN-2}$ and broadcast by transmitting node 200 from antenna $244_{TN-2}$ happen to be of the same pattern as depicted in FIG. 6(c).

The implementation of FIG. 8 can be a Multiple Input Multiple Output (MIMO) antenna system, in which multiple antennas of the transmitting node need to be individually identified. As understood from the preceding discussion, a receiver such as receiver $224_{RN}$ in receiving node (RN) 210 can distinguish between the plural antennas (e.g., antennas $244_{TN-1}$, $244_{TN-2}$) of the same transmitting node by discerning the characteristic time-frequency shift of the received signals and associating the characteristic time-frequency shift with a particular antenna. It will further be appreciated that the transmitting node of FIG. 8 can be a fixed network node such as a radio base station or a radio access network (in which case the receiver node, the transmitting node can be a mobile station). Alternatively or additionally, the transmitting node can be a mobile node. Of course, the nodes described in FIG. 8 need not be dedicated to transmission or reception, as the transmitting node can also have a receiver for two-way communication (and likewise the receiving node can have a transmitter for two-way communication). It will be understood that reference numerals $237_{TN-1}$, $237_{TN-2}$, $260_{TN-1}$, $260_{TN-2}$, $250_1$, $250_2$, $222_{RN}$, and $282_{RN}$ of FIG. 8 refer to comparable elements as elements $137_{TN-1}$, $137_{TN-2}$, $160_{TN-1}$, $160_{TN-2}$, $150_1$, $150_2$, $122_{RN}$, and $182_{RN}$ of FIG. 7(a), for example.

A non-exhaustive list of advantages of the technology summarized herein appears below:

Low pilot overhead: only a single time-hopping sequence for each device is needed for all synchronization and channel estimation tasks.

Large number of distinct time-frequency shifts to identify many devices.

Low number of coincidences between two distinct patterns ensures good channel estimation performance.

Easy to detect: since all the patterns are cyclic time-frequency shifts of each other.

Better delay-Doppler resolution enables responsive initial synchronization. The Costas Array has the additional advantage of better delay-Doppler resolution. For a Costas Array of length L, the time-hopping pattern has L times better Doppler resolution for a single period of observation in time than a regularly spaced pattern. This allows the initial synchronization to be established very quickly.

Scalability: just as a regularly spaced pilot, the disclosed pilot pattern can extend in time and frequency easily by repetitions. It can even skip a certain time-frequency region that may have been occupied by other systems.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A transmitter comprising:
    a combiner configured to introduce pilot signals into a stream of user data as a locally unique time-frequency shift of a time frequency plane array, wherein the time frequency plane array is generated from a regular spaced base signal which is hopped using a hopping sequence, and wherein the locally unique time-frequency shift of the time frequency plane array involves a time shift and a frequency shift,
    a channel transmission element configured to apply the stream of user data with the introduced pilot signals onto a channel,
    a memory configured to store the hopping sequence upon which the time frequency plane array is based, the hopping sequence being configured in the memory so that any two time-frequency shifts of the time frequency plane array has a predetermined number of coincidences.

2. The transmitter of claim 1, wherein the transmitter is an orthogonal frequency division multiplexing (OFDM) transmitter which further comprises:
    a modulator configured to use the data stream to generate plural modulated carriers;
    an Inverse Fast Fourier Transform (IFFT) unit configured to transform the modulated carriers into a sequence of time domain samples.

3. The transmitter of claim 1, wherein the combiner is a multiplexer.

4. The transmitter of claim 1, wherein the predetermined number of coincidences is a non-negative integer.

5. The transmitter of claim 1, wherein the base signal which is used to generate the time frequency plane array is hopped from a regular pattern with respect to one of time and frequency but not both.

6. The transmitter of claim 1, wherein the pilot signals are for providing channel estimation and synchronization, and wherein the locally unique time-frequency shift of the time frequency plane array is configured for providing device identification.

7. A transmitter comprising:
a combiner configured to introduce pilot signals into a stream of user data as a locally unique time-frequency shift of a time frequency plane array wherein the pilot signals are hopped using a hopping sequence, wherein the hopping sequence is a Costas sequence;
a channel transmission element configured to apply the stream of user data with the introduced pilot signals onto a channel,
a memory configured to store the hopping sequence upon which the time frequency plane array is based, the hopping sequence being stored in the memory as a periodic hopping sequence wherein the Costas sequence repeats for one or more periods to accommodate a number of pilot signals in one of the time domain and the frequency domain.

8. A transmitter comprising:
a combiner configured to introduce pilot signals into a stream of user data as a locally unique time-frequency shift of a time frequency plane array wherein the pilot signals are hopped using a hopping sequence, wherein the hopping sequence is a Costas sequence;
a channel transmission element configured to apply the stream of user data with the introduced pilot signals onto a channel,
a memory configured to store the hopping sequence upon which the time frequency plane array is based, the hopping sequence being stored in the memory as a perfect periodic Costas sequence configured by augmenting a Welsh-constructed periodic Costas array with an empty row or an empty column.

9. The transmitter of claim 8, wherein the pilot signals are for providing channel estimation and synchronization, and wherein the locally unique time-frequency shift of the time frequency plane array is configured for providing device identification.

10. The transmitter of claim 9, wherein a device identified by the device identification is a radio access network node.

11. The transmitter of claim 9, wherein a device identified by the device identification is a wireless mobile station.

12. A telecommunications system comprising:
a first orthogonal frequency division multiplexing (OFDM) transmitter which transmits hopped pilot signals as a first locally unique time-frequency shift of a time frequency plane array wherein the pilot signals are hopped using a hopping sequence;
a second orthogonal frequency division multiplexing (OFDM) transmitter which transmits hopped pilot signals as a second locally unique time-frequency shift of the same time frequency plane array;
wherein the first locally unique time-frequency shift is different in both time and frequency from the second locally unique time-frequency shift;
a receiver which identifies a transmitter from which it receives orthogonal frequency division multiplexing (OFDM) signals in accordance with whether received signals are those of the first locally unique time-frequency shift or the second locally unique time-frequency shift of the time frequency plane array.

13. The system of claim 12, wherein the transmitter identified by the receiver comprises a radio access network node.

14. The system of claim 12, wherein the transmitter identified by the receiver comprises a wireless mobile station.

15. The system of claim 12, wherein the hopping sequence upon which the time frequency plane array is based is a Costas sequence.

16. The system of claim 15, wherein the hopping sequence upon which the time frequency plane array is based is a periodic hopping sequence wherein the Costas sequence repeats for one or more periods to accommodate a number of pilot signals in one of the time domain and the frequency domain.

17. The system of claim 12, wherein the hopping sequence upon which the time frequency plane array is based is a perfect periodic Costas sequence configured by augmenting a Welsh-constructed periodic Costas array with an empty row or an empty column.

18. The system of claim 12, wherein the pilot signals are for providing channel estimation and synchronization, and wherein the locally unique time-frequency shift of the time frequency plane array is configured for providing device identification.

19. The system of claim 18, wherein a device identified by the device identification is a radio access network node.

20. The system of claim 18, wherein a device identified by the device identification is a wireless mobile station.

21. A receiving node of a telecommunications systems, the receiving node comprising:
a receiver configured to receive orthogonal frequency division multiplexing (OFDM) signals transmitted from a transmitting node, the transmitting node comprising a first antenna and a second antenna, wherein the first antenna of the transmitting node transmits hopped pilot signals as a first locally unique time-frequency shift of a time frequency plane array wherein the pilot signals are hopped using a hopping sequence and the second antenna of the transmitting node transmits hopped pilot signals as a second locally unique time-frequency shift of the same time frequency plane array, and wherein the first locally unique time-frequency shift is different in both time and frequency from the second locally unique time-frequency shift;
a transmitter identifier configured to identify an antenna from the first and second antennas from which it receives the orthogonal frequency division multiplexing (OFDM) signal in accordance with whether received signals are those of the first locally unique time-frequency shift or the second locally unique time-frequency shift of the time frequency plane array.

22. The node of claim 21, wherein the hopping sequence upon which the time frequency plane array is based is a Costas sequence.

23. The node of claim 22, wherein the hopping sequence upon which the time frequency plane array is based is a periodic hopping sequence wherein the Costas sequence repeats for one or more periods to accommodate a number of pilot signals in one of the time domain and the frequency domain.

24. The node of claim 21, wherein the hopping sequence upon which the time frequency plane array is based is a perfect periodic Costas sequence configured by augmenting a Welsh-constructed periodic Costas array with an empty row or an empty column.

25. The node of claim 21, wherein the pilot signals are for providing channel estimation and synchronization, and wherein the locally unique time-frequency shift of the time frequency plane array is configured for providing device identification.

26. The node of claim 25, wherein the node is a radio access network node.

27. The node of claim 25, wherein the node is a wireless mobile station.

28. A method of operating a telecommunications system comprising:
   transmitting, from a first transmitter, hopped pilot signals as a first locally unique time-frequency shift of a time frequency plane array wherein the pilot signals are hopped using a hopping sequence;
   transmitting, from a second transmitter, hopped pilot signals as a second locally unique time-frequency shift of the same time frequency plane array, wherein the first locally unique time-frequency shift is different in both time and frequency from the second locally unique time-frequency shift; and,
   identifying a transmitter from which a receiver receives signals in accordance with whether received signals are those of the first locally unique time-frequency shift or the second locally unique time-frequency shift of the time frequency plane array.

29. The method of claim 28, wherein the hopping sequence upon which the time frequency plane array is based is a Costas sequence.

30. The method of claim 29, wherein the hopping sequence upon which the time frequency plane array is based is a periodic hopping sequence wherein the Costas sequence repeats for one or more periods to accommodate a number of pilot signals in one of the time domain and the frequency domain.

31. The method of claim 28, wherein the hopping sequence upon which the time frequency plane array is based is a perfect periodic Costas sequence configured by augmenting a Welsh-constructed periodic Costas array with an empty row or an empty column.

32. The method of claim 28, wherein the pilot signals are for providing channel estimation and synchronization, and wherein the locally unique time-frequency shift of the time frequency plane array is configured for providing device identification.

33. The method of claim 32, wherein a device identified by the device identification is a radio access network node.

34. The method of claim 32, wherein a device identified by the device identification is a wireless mobile station.

35. The method of claim 28, wherein the first transmitter is a first orthogonal frequency division multiplexing (OFDM) transmitter and the second transmitter is a second orthogonal frequency division multiplexing (OFDM) transmitter, and wherein the method further comprises:
   transmitting, from the first orthogonal frequency division multiplexing (OFDM) transmitter, data and the hopped pilot signals as the first locally unique time-frequency shift of the time frequency plane array;
   transmitting, from the second orthogonal frequency division multiplexing (OFDM) transmitter, data and the hopped pilot signals as the second locally unique time-frequency shift of the time frequency plane array.

36. A receiver comprising:
   a channel reception element configured to receive a stream of user data into which pilot signals have been introduced in accordance wit a time-frequency shift of a time frequency plane array which includes the received signals;
   a transmitter identifier configured to identify a transmitter from which the receiver receives signals in accordance with the time-frequency shift of a time frequency plane array which includes the received signals, wherein the time frequency plane array reflects a regular spaced base signal which is hopped using a hopping sequence, and wherein the locally unique time-frequency shift of the time frequency plane array involves a time shift and a frequency shift;
   a memory configured to store the hopping sequence upon which the time frequency plane array is based, the hopping sequence being stored in the memory as a Costas sequence which repeats for one or more periods to accommodate a number of pilot signals in one of the time domain and the frequency domain.

37. The receiver of claim 36, wherein the receiver receives orthogonal frequency division multiplexing (OFDM) signals in accordance with the time-frequency shift of the time frequency plane array which includes the received signals, the time frequency plane array being an expression of a combination of pilot signals and user data.

38. The receiver of claim 36, wherein the pilot signals are for providing channel estimation and synchronization, and wherein the locally unique time-frequency shift of the time frequency plane array is configured for providing device identification.

39. The receiver of claim 36, wherein a device identified by the device identification is a radio access network node.

40. The receiver of claim 36, wherein a device identified by the device identification is a wireless mobile station.

41. A receiver comprising:
   a channel reception element configured to receive a stream of user data into which pilot signals have been introduced in accordance with a time-frequency shift of a time frequency plane array which includes the received signals;
   a transmitter identifier configured to identify a transmitter from which the receiver receives signals in accordance with the time-frequency shift of a time frequency plane array which includes the received signals, wherein the time frequency plane array reflects a regular spaced base signal which is hopped using a hopping sequence, and wherein the locally unique time-frequency shift of the time frequency plane array involves a time shift and a frequency shift;
   a memory configured to store the hopping sequence upon which the time frequency plane array is based, the hopping sequence being stored in the memory as a perfect periodic Costas sequence configured by augmenting a Welsh-constructed periodic Costas array with an empty row or an empty column.

* * * * *

UNITED STATES PATENT AND TRADEMARK OFFICE
CERTIFICATE OF CORRECTION

PATENT NO.          : 7,711,029 B2                                              Page 1 of 1
APPLICATION NO.     : 11/292415
DATED               : May 4, 2010
INVENTOR(S)         : Guey It is certified that error appears in the above-identified patent and that said Letters Patent is hereby corrected as shown below:

In Column 9, Line 26, in Equation (4), delete " $e^{j2\pi nF_p t}$, " and insert -- $e^{j2\pi nF_p t}$, --, therefor.

In Column 16, Line 26, in Claim 21, delete "systems," and insert -- system, --, therefor.

In Column 16, Line 45, in Claim 21, delete "signal" and insert -- signals --, therefor.

In Column 18, Line 4, in Claim 36, delete "wit" and insert -- with --, therefor.

Signed and Sealed this

Seventh Day of September, 2010

David J. Kappos
*Director of the United States Patent and Trademark Office*